April 30, 1957 E. F. KOHL ET AL 2,790,722
SHELL MOLD STRUCTURES AND PROCESSES AND
COMPOSITIONS FOR FORMING THE SAME
Filed Aug. 14, 1952
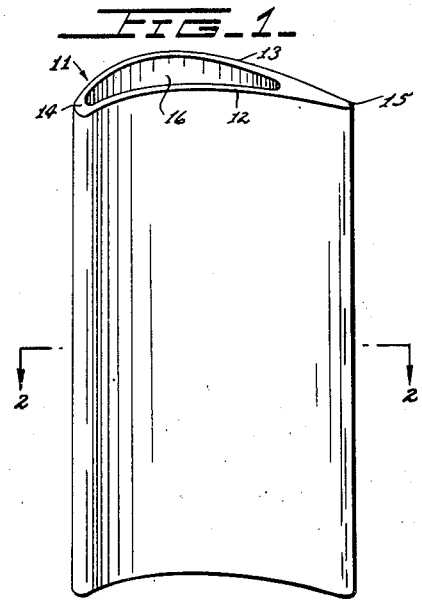
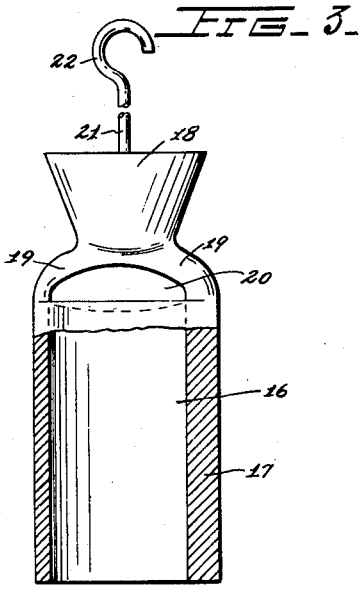
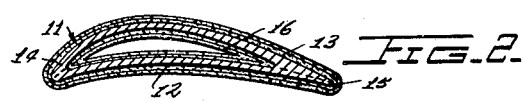
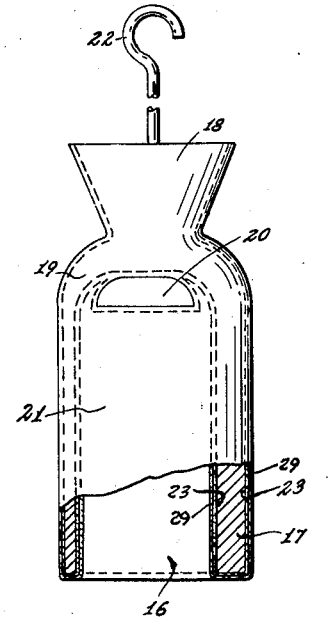
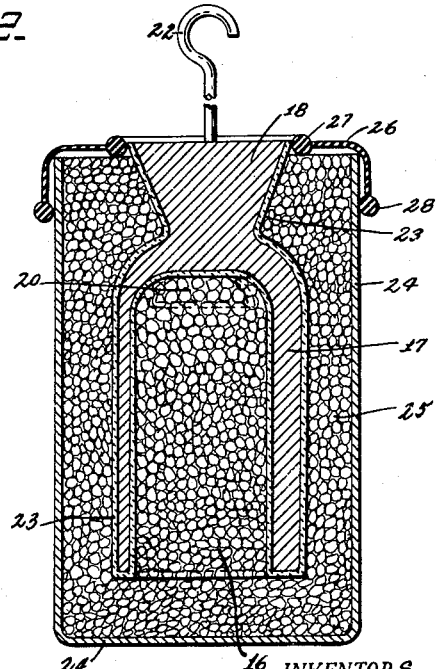
INVENTORS
EVERARD F. KOHL
ZENON KAZENAS
BY
John Mahoney
ATTORNEY

United States Patent Office 2,790,722
Patented Apr. 30, 1957

2,790,722

SHELL MOLD STRUCTURES AND PROCESSES AND COMPOSITIONS FOR FORMING THE SAME

Everard F. Kohl, Lakewood, and Zenon Kazenas, East Cleveland, Ohio; said Kazenas assignor to Mercast Corporation, a corporation of Delaware Application August 14, 1952, Serial No. 304,308

30 Claims. (Cl. 106—38.35)

This application is a continuation-in-part of our application Ser. No. 7,955, filed February 12, 1948, now abandoned; Ser. No. 113,452, filed August 31, 1949, now abandoned; Ser. No. 114,824, filed August 31, 1949; and Ser. No. 257,328, filed November 20, 1951.

This invention relates to processes for preparing shell mold structures by means of frozen mercury patterns defining the cavity into which objects are to be cast, to mold structures produced by such processes, and to compositions utilized in preparing such mold structures.

As a result of past efforts, there has been developed a commercial method of preparing precision castings by what is known as the "lost-wax" method. However, the "lost-wax" method of precision casting has many serious limitations, including the fundamental limitation imposed by the fact that wax-type impermanent pattern material has a relatively high expansion coefficient of about 9% by volume near its melting or freezing point. As a result, molds formed on wax-type patterns must be made quite thick to resist the large initial expansion forces of the wax pattern when it is brought to melting temperature for removing it from the mold cavity.

Serious difficulties are also encountered when metal having a high melting temperature, such as 1500° C. or more is cast into the cavity of a relatively thick mold formed of a refractory material having poor heat conducting properties because the inner shape-controlling surface layer of the thick mold is subjected to thermal shock and large expansion forces, causing cracks and deformation in its inner surface layer. It is also difficult to remove the relatively large mass of investment material of the mold from the casting.

The "lost-wax" method of preparing precision castings has been confined, therefore, to the production of comparatively small objects having a contour of such shape that it is not necessary for the cast object to contract about parts of the mold during cooling.

In its fundamental aspects, the present invention is based on the discovery that the very small dimensional change of frozen mercury near its melting or freezing temperature, makes it possible to form on frozen mercury patterns thin-walled molds that would crack if formed around a pattern of wax material, when it expands as it is brought to melting temperature. The invention is also based on the further discovery, that such thin-walled shell mold may be formed on frozen mercury patterns with much finer refractory particle material, such as zirconite stabilized and unstabilized zirconium oxide or beryllium oxide, resulting in mold cavities of very fine surface finish and yielding castings of correspondingly fine surface finish. The invention also involves the discovery that such thin-walled molds formed on frozen mercury patterns exhibit high thermal shock resistance and do not crack when casting into them, metals of high melting point, such as stainless steel alloys. The invention also involves the further discovery that such thin-walled shell molds may be given high porosity which is of great advantage in providing for the escape of gases developed when molten metal of high melting point is poured into the mold cavity.

An important phase of the present invention is to provide a thin shell mold produced by applying one or more strata of a coating composition to a frozen mercury pattern which forms thereon a relatively thin strata of a shell mold with a casting cavity into which molten material is to cast. Because of the low thermal expansion coefficient of mercury, a frozen mercury pattern may be liquefied and removed from comparatively thin shell molds and consequently in preparing shell molds in which frozen mercury is utilized as the pattern material, it is only necessary to make the walls of the shell mold adjacent the pattern of sufficient thickness to resist the impact of molten material cast within the mold cavity. The shell mold may therefore be made sufficiently thin so as to yield when the molten material cast into the mold cavity contracts about portions of the mold during cooling and imposes strains on at least some of the shell wall portions.

This thin shell mold structure conforming to the shape of the object to be cast, is composed of a coating composition comprising a predominant amount of refractory particles and a suitable binder or binders to form a thin, hard, yieldable shell. Because of the thinness of the shell mold, the vaporization of any solvents or carriers present in the coating composition is expedited, thereby providing rapid drying and hardening of the mold.

The various phases of the invention will be better understood from the following description and exemplifications thereof with particular reference to the drawings, in which—

Fig. 1 is an isometric view of a vane of gas turbine to be cast in accordance with the invention;

Fig. 2 is a cross-sectional view of the vane, and of its frozen mercury pattern (Fig. 3) shown with a shell mold of the invention formed thereon;

Fig. 3 is a partial sectional view of a frozen mercury pattern used in making a shell mold for the vane of Fig. 1;

Fig. 4 is an elevational view, partly in cross-section of the frozen mercury pattern of Fig. 3, with one type of a shell mold of the invention formed thereon; and Fig. 5 is a vertical cross-section of the frozen mercury pattern of Fig. 3 with another type of shell mold formed thereon, as held in a flask by a mass of loose refractory particles.

Referring to Figs. 1 through 4, there will now be described the phase of the invention wherein one form of a thin-walled shell mold is formed on a complex frozen mercury pattern. Figs. 1 and 2 indicate, by way of example, a gas turbine vane 11 having a hollow interior 16 and which is to be cast in accordance with the invention. The vane 11 has an air-foil contour with a generally concave thin blade section 12 and a generally convex thin blade section 13 joined along the front edge region 14 and rear edge region 15. The vane 11 may also have an axial twist along its length.

Fig. 3 shows a cross section of the frozen mercury pattern 17 of vane 11 with a sprue 18 of frozen mercury attached thereto by means of frozen mercury arms 19 which bridge the narrow border regions of the vane-shaped frozen mercury pattern. This bridge arrangement provides coating passages to the inner surfaces of the hollow frozen mercury pattern 17 facing the hollow interior 16, which inner pattern surfaces are to be coated with the shell-forming coating compositions. A rigid metal hook 22 having a shank which is frozen in the sprue gate portion 18 of the frozen mercury pattern, is utilized in manipulating the frozen mercury pattern while coating it with the shell mold forming composition. Frozen mercury in the pure state is especially suitable for practicing the invention, although it is not limited thereto as long as the impurities do not affect physical properties of mercury which render it suitable for practicing the invention.

The frozen mercury pattern 17 is now ready for coating with the mold forming composition. This is accomplished by repeatedly immersing the frozen mercury pattern in, or pouring over its surface a slurry of the coating composition maintained at a temperature below the freezing point of mercury. The coating slurry comprises a liquid carrier holding dispersed or dissolved therein fine particles of refractory material, a raised temperature binder for the refractory particles which is ineffective at the freezing temperature of mercury but which becomes effective as a binder for the refractory particles at raised temperatures, and an organic resinous binder that is adherent to the frozen mercury pattern at temperatures below the freezing point of the pattern and which has the properties of binding the refractory particles and the raised temperature binder together at temperatures ranging from below the freezing point of mercury up to the temperature at which the raised temperature binder becomes effective as a binder for the refractory particles and of causing the bound particles to adhere to the frozen mercury pattern. The raised temperature binder is so chosen that it becomes effective as a binder for the refractory particles at temperatures below that at which the organic resinous binder becomes modified to impair or lose its binding properties. The liquid carrier is chosen to have a low boiling point and to volatilize in a short period of time at temperatures in the range from below the freezing temperature of mercury up to about normal temperatures, such as −50° C. to −40° C. up to 0° C. The viscosity of the refractory slurry depends upon the size and complexity of the frozen mercury pattern to be coated. For example, the slurry must be thin enough to readily penetrate all openings and all narrow corners. Between each successive coating, by immersion or dipping of the pattern in the slurry by spraying it, a period of time is allowed to at least partially dry the applied coating layer or film. The successive coating and drying operations are carried on until a shell layer of the desired thickness has been formed around the exposed surface of the frozen mercury pattern. After the last layer or film is applied, the shell layer is dried.

Both the coating and drying of each shell layer stratum should be carried on in an atmosphere refrigerated to well below the freezing point of the mercury pattern material. In particular, the drying of the shell mold layer should be effected at temperatures below the boiling point of the carrier so as to provide a smooth film or shell layer. The drying may be expedited by circulating through the drying space where intermittent drying takes place, an atmosphere of air refrigerated to below the freezing temperature of the mercury pattern material and below the boiling point of the carrier. The vapor of the liquid carrier absorbed into the refrigerated atmosphere may be recovered therefrom by conventional compression techniques or the like, whereby the liquid carrier may be used again to form the coating composition. The continuous circulation of the refrigerated atmosphere from which the carrier vapors have been removed, also reduces the vapor pressure of the liquid carrier, thereby expediting the volatilization of the liquid carrier from the coating layers. A suitable degree of vacuum may be applied to the drying space for expediting the volatilization of the carrier.

Figs. 4 and 2, show a substantially self-supporting mold structure with thin shell walls consisting of the shell layers formed in accordance with the invention over the frozen mercury pattern of the vane of Fig. 3. The thin shell mold generally designated 21 has an inner thin shell layer 23 and an overlaying supporting or backing shell layer 29 forming with the inner shell layer 23 a self-supporting shell mold structure from which the frozen mercury pattern 17 may be readily removed by heating to above its melting point and pouring it out of the mold cavity. The two layer shell mold 21 so formed is sufficiently thin to yield when molten metal cast into the mold cavity contracts about parts of the shell mold such as the inner core of the shell mold 21, thereby preventing formation of cracks in the casting. When the frozen mercury pattern of the object to be cast is comparatively thin, as in the case of the thin wall gas turbine vane, the walls of the shell mold of the type shown in Fig. 4 may have an overall thickness from about $\frac{1}{16}$ to about $\frac{3}{16}$ inch.

Referring to Fig. 2, the inner shell layer 23 is first formed over the exposed surfaces of the frozen mercury pattern 17 by applying thereto several strata of the slurry-like shell-forming coating composition, each coating stratum being at least partially dried before applying thereover the next stratum of the coating composition in the manner explained hereinabove.

After drying the exterior stratum of the inner shell layer 23, the outer supporting backing shell layer 29 is formed thereover with a modified shell-forming coating composition having characteristics similar to that used for forming the inner shell layer 23. In order to give the outer backing shell layer 29 relatively great strength, the refractory particle material of the backing layer coating composition is chosen so that it contains partly coarse size particles and partly fine size particles. Such double shell layer mold may be made with a very thin inner shell layer of fine refractory particles, the outer backing shell layer 29 with its coarser refractory particles providing the required strength, while the combined overall thickness of the two shell layers 23, 29 is small enough to permit wall portions of the shell mold to yield when the molten metal cast into the mold cools and contracts about portions of the mold which it surrounds. By way of example, for cast objects of the type described such as the gas turbine vanes or gas turbine buckets, good results are obtained with the inner shell layer 23 made with a wall thickness of about $\frac{1}{64}$ to $\frac{1}{32}$ inch, and the overall thickness of the two shell layers 23, 29, about $\frac{1}{16}$ to $\frac{3}{16}$ or $\frac{1}{4}$ inch.

According to a phase of the invention, explained in connection with Fig. 5, frozen mercury patterns may also be used to form thereon thin single-layer shell molds, the walls of which are backed in a special way by a mass of relatively loose refractory particles. Fig. 5 shows the same frozen mercury pattern 17 of the hollow vane Fig. 3 having formed thereon only a single layer shell mold 23 corresponding to the inner shell layer 23 of the two-layer mold of Figs. 2, 4. The thin shell mold 23 of Fig. 5 is formed over the frozen mercury pattern 17 in the same way as the inner shell layer 23 of the two layer shell mold 21 shown in Figs. 2, 4. The walls of the thin shell mold 23 of Fig. 5 are made sufficiently thin to yield when molten metal contracts about part of the shell mold in cooling thus preventing damage to the casting and cracking thereof. In case of frozen mercury patterns for thin castings, such as the vane of Figs. 1, 2, the walls of the shell mold 23 may have an overall thickness from about $\frac{1}{32}$ to about $\frac{1}{8}$ inch.

Refractory particles having an average particle size from minus 4 mesh to minus 12 mesh are suitable for use as a backing structure for a shell mold of the type described. When the coated pattern is of small size and is complicated in shape, small-sized particles, such as minus 8 mesh, plus 32 mesh, are satisfactory, whereas larger-sized particles, such as minus 4 mesh and plus 16 mesh are satisfactory when the shell mold is simple in shape, or is of a larger size.

To prevent the loose supporting particles from being displaced during handling of the flask, a cover 26 is placed over the top of the flask 24. The cover 26 may be formed of any suitable material, such as fabric, plastic, rubber, or metal plate, of steel, for instance, and when assembled in place, it has a reinforced portion 27 adjacent that portion of the shell mold 23 formed around sprue 18, and a downwardly extending flange provided with a reinforcement 28 engaging the upper sides of the flask. The cover may also consist of a partible metal plate, the parts of which may be brought together around the sprue 18 to fit over and be secured to the top of the flask.

The flask 20 holding the shell mold with the mercury pattern embedded in the mass of loose backing particles is now raised to a temperature above the freezing point of mercury in order to liquefy the mercury. The frozen mercury may be quickly melted by bringing liquid mercury into contact with the mercury in the mold cavity. Because of the thermal conductivity of the mercury, the frozen mercury pattern is readily liquefied in this process. Another and effective method of liquefying the frozen mercury pattern is to place or pass the flask or the mold containing the frozen mercury pattern through a high-frequency induction field.

After the mercury pattern has been liquefied, the mercury is poured from the shell mold by inverting the flask. The frozen mercury pattern may also be provided with a narrow sprue outlet portion at its bottom, in which case the liquid mercury may be drained from the bottom of the mold. The small aperture remaining in the bottom portion of the mold may be plugged with refractory material prior to casting the molten metal into the mold cavity. The cover 26, if formed of a heat decomposable material, may be removed from the flask after pouring out the mercury.

To harden the shell mold and render it resistant to molten metal having a high melting point, the flask 24 with the shell mold 23 and backing mass 25 held therein is now heated in a furnace to a sufficiently high temperature to cause the raised temperature binder to become effective as a binder for the refractory particles in the shell mold and to modify the organic resinous binder as by driving it off, or vaporizing it, to thereby impart porosity to the shell mold. The baking or firing temperature, which may vary between approximately 540° to 1250° C. as well as the time required for baking depend upon several factors, such as the size and thickness of the shell mold, the temperature of the molten metal to be cast, and the hardness of the mold surface required.

When the shell mold has been properly hardened, the flask with the mold contained therein, is removed from the furnace and mold is now ready for casting. When high melting temperature metal is to be cast, or where thin sections are involved, the metal is cast into the shell mold while the mold is still hot. In casting metal having a low fusion point, it is also desirable to cast the metal into a hot mold in order to prevent solidification of the metal before it completely fills the mold.

After the cast metal has been cooled and solidified, the casting may be retrieved by pouring out the loose refractory particles from the flask. A large portion of the shell mold may be easily broken away while the remainder of the refractory mold may be removed by blasting, such as sand blasting.

By way of example, for cast objects having a wall thickness of about $\frac{1}{16}$ to $\frac{1}{4}$ inch, the inner shell layer may have a thickness of $\frac{1}{64}$ to $\frac{1}{16}$ of an inch, and the over-all thickness of the two shell layers 37 and 38 of the completed shell mold may be $\frac{1}{16}$ to $\frac{1}{4}$ of an inch thick.

It will of course be understood that as the thickness of the frozen mercury pattern of the object to be cast is increased, the thickness of the shell layer, or the combined thickness of the two shell layer, which is applied to the pattern must also be increased to provide upon the liquefaction and removal of the mercury a shell mold of sufficient thickness to resist the impact of the molten metal cast into the shell mold which in such case will be larger in amount than when a thin casting cavity is provided. When a shell mold having an average thickness of $\frac{1}{4}$ to $\frac{3}{8}$ of an inch is provided, the average thickness of the inner shell layer when two shell layers are provided may vary from approximately $\frac{1}{32}$ to $\frac{1}{16}$ of an inch in thickness.

According to the invention, the shell-forming coating compositions which are or may be utilized in preparing the inner shell mold layer of the invention comprises refractory particles in proportions constituting a predominant amount of the solid ingredients of the composition, a raised temperature binder that is ineffective as a binder for the refractory particles at the freezing temperature of mercury but which becomes effective at or above normal temperatures and which after becoming effective binds the refractory particles together up to the casting temperature of substantially all metals and alloys as well as at low temperatures, and an organic resinous binder having the properties of being adherent to a frozen mercury pattern at temperatures below the freezing point of the pattern and being coherent to previously applied layers or films of the same or a similar composition at temperatures below the freezing point of mercury. The organic resinous binder must also be capable of binding the refractory particles and the raised temperature binder together at temperatures ranging from below the freezing point of mercury up to the temperature at which the raised temperature binder becomes effective as a binder for the refractory particles. It is also desirable that the organic resinous binder shall have the property of becoming modified under the influence of heat, such as by decomposition or vaporization, to provide vapors which exude through the applied coating to provide a porous shell mold. Throughout the entire baking period, the raised temperature binder which is utilized should become effective as a binder for the refractory particles at temperatures below that at which the organic resinous binder becomes modified. In preparing the shell mold, however, it is not essential that the raised temperature binder shall form part of the coating composition because after the mercury has been liquefied and removed from the coating to provide the mold cavity the shell mold may be impregnated with a binder that becomes effective as a binder for the refractory particles at raised temperatures.

To enable the composition to be applied in the form of a slurry to the frozen mercury pattern, a carrier for the solid ingredients of the composition is provided that must be in the liquid state at temperatures at least as low as that of the frozen mercury pattern and which has a boiling point below normal temperatures so that it will volatilize in a short period of time at temperatures below the freezing point of the pattern.

Any suitable refractory material that may be formed into fine particles and which is resistant to high temperatures may be used in shell-forming coating compositions for preparing the shell molds of the invention. Among such refractory materials are zirconia (zirconium oxide), particularly, in its stabilized form, zirconium silicate, silica, chromite, magnesium oxide, aluminum silicate, such as sillimanite or mullite, alumina, ground quartz, flint, silicon carbide, a mixture of two or more of such materials, or a mixture of magnesium oxide and calcium oxide. Very good results are obtained by using stabilized zirconia or a refractory silicious material, such as zirconium silicate. Good results are obtained with the refractory particles for mining from approximately 85% to 95% or more of the normally solid ingredients of the composition.

In preparing the coating composition for application as coating strata to a frozen mercury pattern to build up a coating to form a thin, single layer shell mold, such as shown at 23 or the inner shell layer 23 of Fig. 2, the refractory particles should be sufficiently fine as to provide a smooth hard mold cavity surface so that when metal is cast into the mold cavity a metal casting having a smooth surface will be obtained. Particles of an average size from minus 60 mesh to minus 1000 mesh (passing through screens of 60 to 1,000 meshes per square inch) are suitable. Extremely fine refractory particles, however, are not necessary as a comparatively smooth surface will be obtained when the refractory particles are of a size from minus 140 mesh to about minus 350 mesh. When an extremely fine refractory material is used, the shell mold is not as porous as when made with refractory material of somewhat larger particle size, and the mold is liable to crack during firing, or when molten metal is cast into the mold cavity. When extremely fine particles are utilized, it is desirable, therefore, to have coarser particles mixed therewith in amounts ranging from 80% to 90%.

A suitable low-temperature binder for the refractory particles at temperatures ranging from below the freezing temperature of the frozen mercury pattern up to at least normal temperatures and which has the physical properties of being adherent to a frozen mercury pattern and coherent to additional layers or films of the same or an equivalent composition at temperatures below the freezing point of mercury, is an organic resinous material consisting predominantly of carbon and hydrogen which contains some oxygen atoms, such as polymerized n-butylmethacrylate, high or low viscosity polymerized isobutylmethacrylate, polymerized vinyl acetate or ethyl cellulose that has been ethylated to a material extent, such as containing, on the average, one to three ethyl groups per glucose unit. An organic resinous material consisting predominantly of carbon and hydrogen but which contains some nitrogen atoms may also be employed, such as the copolymers of acrylonitrile and butadiene ranging in proportions from approximately 33% acrylonitrile and 67% butadiene to 40% acrylonitrile and 60% butadiene. The polymer of butadiene alone may also serve as a binder. All of the foregoing organic resinous binders which are suitable for use as a low temperature binder in investment coating compositions of the invention are of the synthetic type. A mixture of two or more of the binders may also be utilized.

A mixture of polymerized vinyl acetate and ethyl cellulose that has been ethylated to an extent of 46.5% or more, such as 49%, is particularly desirable as the organic resinous binder in certain applications. When ethyl cellulose is utilized as a binder for the refractory material, or in combination with one of the other binders the coating layer is more resistant to moisture than coating compositions in which it is not present. On the other hand, the polymerized vinyl acetate retains its binding properties to a greater degree at temperatures ranging from 425° to 540° C. than ethyl cellulose. When a coating composition containing polymerized vinyl acetate is applied to a frozen mercury pattern to form a layer or film, the applied layer or film is also more adherent to the frozen mercury pattern and is more coherent to a previously applied layer or film of the same or similar compositions than layers or films which contain ethyl cellulose as the organic resinous binder. A coating composition containing both ethyl cellulose and polymerized vinyl acetate possesses the advantageous properties of both binders, and has been found highly satisfactory.

In utilizing—as an organic resinous binder—a mixture of polymerized vinyl acetate and ethyl cellulose that has been ethylated to an extent of at least 46.5%, their relative proportions may be varied. For instance, an organic resinous binder consisting principally of polymerized vinyl acetate and containing a small but substantial amount of the ethyl cellulose will have more desirable properties when utilized in the coating composition than polymerized vinyl acetate alone, and likewise, an organic resinous binder consisting principally of ethyl cellulose and a small but substantial amount of polymerized vinyl acetate will have more desirable properties when utilized in the coating composition than ethyl cellulose alone. Generally stated, when utilizing a mixture of polymerized vinyl acetate and ethyl cellulose, the organic resinous binder may consist of from approximately three to six parts by weight of polymerized vinyl acetate and one part by weight of ethyl cellulose to form three to six parts by weight of ethyl cellulose and one part by weight of polymerized vinyl acetate. Investment compositions in which the polymerized vinyl acetate and ethyl cellulose are present in equal proportions are satisfactory. It has been found to be desirable, however, and particularly when the investment composition is to be applied to the frozen mercury pattern by dipping the pattern in the composition, to utilize an excess of the polymerized vinyl acetate. For instance, the organic resinous binder may consist of three to six parts by weight of polymerized vinyl acetate to one part by weight of the ethyl cellulose.

The copolymers of acrylonitrile and butadiene when utilized in coating compositions as the organic resinous binder for the refractory material, have greater strength over a temperature ranging from approximately 425° to 450° C. than the other binders mentioned, and, consequently are also particularly adapted to be utilized in combination with ethyl cellulose in proportions ranging from approximately three to six parts by weight of the copolymers and one part by weight of the ethyl cellulose to one part by weight of the copolymers and from three to six parts by weight of the ethyl cellulose.

In the coating compositions for preparing the inner shell layer and also the other supporting shell layer, the amount of the organic resinous binder which is adherent to a frozen mercury pattern and coherent or adherent to previously applied layers or films of the same or a similar composition may vary from approximately .25% to 5% or even somewhat higher up to 7% of the portion of the coating composition that is in the solid state after the liquid carrier vaporize. Good results are obtained with the amount of the low temperature binder forming from approximately .5% to 2% of that portion of the coating composition which is in the solid state after the liquid carrier vaporizes.

It is also useful to embody in the coating composition a thermosetting resinous material, such as coumarone-indene resin or a phenol-formaldehyde condensation product in its intermediate soluble stage, in an amount ranging from .3% to 3% of the weight of the solid ingredients of the composition. The phenol-formaldehyde condensation product in its intermediate soluble stage is not adherent to a frozen mercury pattern and has no binding properties at or below the freezing temperature of mercury. It does, however, have the property of imparting a smoother surface to the coating strata applied to the frozen mercury pattern. Its presence in the composition, however, is not essential because coating compositions containing any one, or a mixture, of the organic resinous binders previously described, may be applied in the form of a smooth layer or film to a frozen mercury pattern and the compositions containing such organic resinous binder will not only adhere to and cause the refractory material and the raised temperature binder to adhere to the frozen mercury pattern, but they will also bind the refractory material and the raised temperature binder together at temperatures ranging from below −40° C. up to the temperature at which the raised temperature binder becomes effective as a binder for the refractory material.

The shell-forming slurry-like coating composition to be applied to the frozen mercury pattern also contains a suitable liquid carrier which holds the refractory particles and the raised temperature binder in a dispersed state and also holds the organic resinous binder in a dispersed or dissolved state. It is desirable to use a carrier which is a solvent for the organic resinous binder and which at least partially dissolves the phenol-formaldehyde condensation product if it is present in the composition. The liquid carrier should be present in an amount sufficient to provide with the normally solid ingredients of the composition a slurry of sufficiently low viscosity to enable the composition to be applied to the frozen mercury pattern in the form of a stratum or film by dipping the frozen mercury pattern in the slurry although it is within the scope of the present invention to apply the composition in any suitable way, such as by pouring, brushing, pumping or spraying the composition on the frozen mercury pattern.

A suitable liquid carrier is one which is liquid when applied to the frozen mercury pattern below its freezing temperatures, such as −40° C. and has a boiling point at normal temperatures, such as at approximately 15° to 25° C. or within a temperature range of 55° C. to 65° C. higher than the freezing temperature, minus 40° C., of mercury at atmospheric pressure, and particularly an organic liquid that is a solvent for the organic resinous binder and which has a boiling point between about −20° and 0° C. or within a temperature range from the freezing point of mercury up to 40° C. higher than said freezing temperature at atmospheric pressure. Liquefied monochlorodifluoromethane (Freon 22) or dichlorodifluoromethane (Freon 12), liquefied methyl chloride, or a mixture of the same has proven satisfactory. Polymerized n-butylmethacrylate, polymerized isobutylmethacrylate, and polymerized vinyl acetate are also soluble in liquefied dimethyl ether which may be utilized as a carrier when one of those binders is utilized, either alone or mixed with one of the other carriers or solvents. All of the organic resinous binders given above are also soluble in dichloromonofluoromethane (Freon 21) while trichloromonofluoromethane (Freon 113) is a solvent for ethyl cellulose. Dichloromonofluoromethane and trichloromonofluoromethane, however, boil at temperatures considerably above −18° C. and consequently, the drying of a layer or film of the coating composition on a frozen mercury pattern will be slower when one of those carriers is utilized than carriers having a lower boiling point. Similar conditions apply to other liquid carriers of a similar type, such as monochloropentafluoroethane (Freon 115) octafluoro-cyclobutane (Freon C–118), dichlorotetrafluoroethane (Freon 114) and the like. When such higher boiling carriers are utilized, it is desirable, therefore, to mix one or both of them with a carrier having a lower boiling point, such as liquefied monochlorodifluoromethane.

The desired liquid carrier for the solid ingredients of the composition may also be formed of a mixture of other liquids or liquefied gases and particularly when the organic resinous binder which is utilized is soluble in such mixture of liquids. For instance, polymerized isobutylmethacrylate is soluble in a mixture consisting of 90% dichlorodifluoromethane (Freon 12) and 10% dichloromonofluoromethane (Freon 21) and ethyl cellulose and polymerized vinyl acetate are soluble in dichlorodifluoromethane (Freon 12) when mixed with 30% or more of liquefied dichloromonofluoromethane (Freon 21).

As the carrier, liquefied monochlorodifluoromethane has proven to be especially suitable for use in coating compositions which are to be applied to frozen mercury patterns because it is a gas at normal temperature, is in the liquid state at the temperature of the frozen mercury pattern, and volatizes in a short period of time at temperatures below 40° C.

A sufficient amount of the liquid carrier should be present to hold dispersed or dissolved the organic resinous binder as well as other coating ingredients, and to provide, together with the solid composition ingredients, a slurry of the desired viscosity, which viscosity may be varied over a considerable range in accordance with the specific patterns. For coating intricate frozen mercury patterns, the viscosity of the slurry for preparing the inner shell layer should be about 100 to 150 centipoises at −60° C. so that the slurry when applied will penetrate into indentations and small openings and will form a thin film or stratum on thin blades or fins arranged in close proximity to each other. For less intricate patterns, the viscosity of the slurry may be higher, up to about 250 centipoises at −60° C. The slurry for the outer backing shell layer may have a still higher viscosity, such as in the range of from 400 to 1600 centipoises at −60° C.

The raised temperature binder for the refractory particles is so chosen as to become effective as a binder for the refractory particles at or above normal temperatures and which, after becoming effective, binds the refractory particles together at the casting temperature of substantially all metals and alloys, such as metals or alloys having a fusion point of approximately 1800° C. or higher, as well as at low and intermediate temperatures from below −40° C. Inorganic binders which become effective at temperatures ranging from 150° to 600° C. have proven especially suitable and particularly those having an alkali metal or an ammonium base.

Various compounds or mixtures of compounds have proven suitable as raised temperature binder for shell-forming coating compositions of the invention. Among suitable raised temperature binders are substances having an alkali metal salt base, including the alkali metal fluorides, such as sodium, potassium or lithium fluoride or compounds containing an alkali metal fluoride such as creolite, barium nitrite, boron nitride, phosphorous pentoxide, beryllium fluoride, beryllium borate or tetraborate; also the alkali metal silicates which contain water of crystallization such as sodium or potassium metasilicate. Suitable raised temperature binders are also the primary, secondary or tertiary ammonium phosphate having a particle size ranging from −150 mesh to −325 mesh or less, an alkali metal phosphate or a mixture of an alkali metal and an ammonium phosphate, such as microcosmic salt; or a mixture of two or more of the foregoing compounds.

Among suitable raised temperature binders having an alkali metal salt base are also alkali metal borates or alkali metal tetraborates, such as a borate or tetraborate of sodium, potassium, or lithium, or compounds which react on heating to form an alkali metal borate or an alkali metal tetraborate, or a mixture of an alkali metal borate or an alkali metal fluoride. For instance, a mixture of sodium or lithium flouride and a boron compound, such as boric acid or boric oxide, is satisfactory. The amount of boric acid or boric oxide which is added to a coating composition containing an alkali metal fluoride to provide a raised temperature binder for the refractory material may range from more than incidental impurities, or minute proportion, up to an amount sufficient to react with a major part or all of the alkali metal fluoride. However, at present, best results are obtained with an excess of alkali metal fluoride as part of the raise temperature binder. In general, when sodium fluoride is utilized, the boric acid may be present in amounts up to approximately one part acid in some cases up to three parts by weight of the sodium fluoride. When a shell mold containing sodium fluoride and boric acid or boric oxide is heated to approximately a red heat, the sodium fluoride and boron compound react to form molten borax which envelops the grains of the refractory material to provide a binder therefor. When utilizing an alkali metal fluoride and boric acid or boric oxide, it is desirable to mix the compounds together in such proportions that some of the alkali metal fluoride will be present after the reaction takes place. For instance, approximately three to six parts or more by weight of the sodium fluoride may be utilized to one part by weight of the boric acid, in which case the binder for the refractory material which becomes effective at raised temperatures consists of a mixture of sodium borate and the reaction product of the sodium fluoride and the refractory material.

When a mixture of an alkali metal fluoride with an alkali metal borate or an alkali metal tetraborate is utilized as raised temperature binder of the composition, these ingredients may be present in a wide range of proportions, such as from approximately 99% of the alkali metal fluoride with 1% of the alkali metal borate or alkali metal tetraborate—to 1% of the alkali metal fluoride with 99% of the alkali metal borate or alkali metal tetraborate. The addition of an alkali metal borate or an alkali metal tetraborate to an alkali metal fluoride as a raised temperature binder ingredient increases the hardness of the cavity surface of the mold. The hardness of the mold cavity may thus be regulated by varying the proportion of the alkali metal borate or alkali metal tetraborate in the mixture. On the other hand, the addition of an alkali metal fluoride to an alkali metal borate or an alkali metal tetraborate as a raised temperature binder ingredient increases the strength of the mold at high temperatures. A mixture of an alkali metal borate or an alkali metal tetraborate and an alkali metal fluoride is therefore particularly advantageous in molds requiring a hard cavity surface and high strength at high temperatures.

An ammonium phosphate of small particle size is of advantage as a raised temperature binder ingredient when it is utilized in combination with an organic resinous low-temperature binder that is effecitve in binding the refractory particles together at low temperature, because the ammonium phosphate decomposes at temperatures ranging from 150° to 430° C. to form a phosphoric acid which reacts with the refractory particles before the low temperature binder is substantially modified into a vapor or the like, thus giving the mold good strength throughout the entire baking or hardening range.

The coating composition should contain sufficient raised temperature binder to bind the refractory particles together after the shell mold has been heated to a temperature sufficient to modify the organic resinous binder and also during the casting of molten metal into the shell mold. In general, depending upon the particular binder chosen, amounts of raised temperature binder varying from approximately .1% to 5% of the total amount of solids in the coating composition (after the carrier vaporizes) have given satisfactory results. In compositions for preparing both the inner shell layer and also the outer shell layer, the amount of the raised temperature binder may be .5% to 5% and even somewhat higher up to 7%, by weight, of the solids in the composition (after the carrier evaporates). When primary ammonium phosphate is utilized as the raised temperature binder, approximately 2% to 4% of the binder, based on the total amount of solids in the coating composition has been found to be especially suitable.

The coating composition for producing the outer backing shell layer of a shell mold composed of two or more shell layers, such as backing shell layer 29 (Fig. 4), may be formed of essentially the same ingredients as utilized to form the inner shell layer. However, the refractory particles of the coating composition for the backing shell layer are chosen to be partly of coarse particle size and partly of fine particle size. The fine refractory particles of the composition may be of the same fine particle material as used for forming the inner shell layer. As the coarse refractory particles, any suitable refractory particle material capable of resisting high temperatures may be used, such as prefired firebrick particles, prefired silica sand, zirconia, micaceous material such as vermiculite, an aluminum silicate, such as sillimanite or mullite, or a mixture of two or more of such refractory particle materials. The size of the coarse particles may vary over a wide range, for instance, they may have an average particle size of −12 mesh and +60 mesh.

It is within the broad aspects of the invention to form thin shell molds of the invention with a single shell-forming coating composition as by applying superposed coating strata thereof in any desired manner, such as by dipping, spraying, brushing or pouring, to form a self-supporting thin shell mold of the required thickness. It is also within the broad aspects of the invention to form such thin self-supporting shell mold with inner and outer shell layers produced out of different coating compositions, both of which contain the same fine grade of refractory particle material. However, in actual practice, it has been found desirable to form thin self-supporting shell molds of the invention having an inner shell layer produced with a coating composition containing essentially fine refractory particles and an outer backing shell layer produced with a coating composition containing both coarse and fine refractory particles. By using for the outer shell layer a coating composition of the invention containing coarse refractory particles, the outer shell layer may be built up more quickly, out of less coating strata than would be the case if formed of coating compositions containing the fine grade of refractory particles only. In addition, the coarse refractory particles give the outer backing shell layer greater strength in resisting lateral movement of the relatively thin walls of the shell mold when molten metal of high temperature is cast into the mold cavity. A shell mold having such coarse-particle backing layer exhibits also greater porosity or permeability in permitting the escape of gases evolved in the mold cavity when hot metal is cast into it. When coating composition for forming the backing shell layer are made up with the coarse refractory particles only, they tend to settle from the coating slurry composition, and it is more difficult to apply a uniform coating stratum out of such composition by the usual dipping or spraying processes. This difficulty is avoided by preparing the backing-layer coating composition with an addition of fine-grade refractory particles to the coarse-grade particles in an amount sufficient to substantially hold the coarse refractory particles in suspension within the composition slurry. Good results are obtained with backing-layer slurry compositions wherein the proportion of the fine refractory particles to the coarse refractory particles vary over the range between about 3 to 2 and 1 to 1. In general, depending on the character and the shape of the article to be cast and the size thereof, the proportion of the fine to the coarse particles may be varied over the range between 3 to 2 and 2 to 3.

The following are specific examples of shell-forming coating compositions suitable for preparing the inner shell layer of thin shell molds of the invention of the type shown in Figs. 2 to 5.

*Example A–1*

| | Grams |
|---|---|
| Liquefied monochlorodifluoromethane (Freon 22) | 10,500.0 |
| Polymerized vinyl acetate having a viscosity of 700 to 900 centipoises at 20° C. with molar solution in benzene | 141.8 |
| Ethyl cellulose that has been ethylated to an extent of 46.5% to 48.5% and having a viscosity of 20 centipoises when a 5% solution thereof is dissolved in a mixture of 80% toluene and 20% ethanol | 47.3 |
| Phenol-formaldehyde condensation product condensed to its intermediate soluble stage | 94.5 |
| Boric acid | 46.2 |
| Sodium fluoride | 140.7 |
| Zirconium silicate, −325 mesh particle size | 18,429.5 |

*Example A–2*

| | Grams |
|---|---|
| Liquefied monochlorodifluoromethane (Freon 22) | 21,000 |
| Polymerized vinyl acetate having a viscosity of 700 to 900 centipoises at 20° C. with molar solution in benzene | 284 |
| Ethyl cellulose that has been ethylated to an extent of 46.5% to 48.5% and having a viscosity of 20 centipoises when a 5% solution thereof is dissolved in a mixture of 80% toluene and 20% ethanol | 94 |

|   | Grams |
|---|---|
| Phenol-formaldehyde condensation product condensed to its intermediate soluble stage | 189 |
| Primary ammonium phosphate, —325 mesh particle size | 1,325 |
| Zirconium silicate, —325 mesh particle size | 35,925 |

*Example A-3*

|   | Grams |
|---|---|
| Liquefied monochlorodifluoromethane (Freon 22) | 1,950.0 |
| Ethyl cellulose, ethylated to 46.5% and a 5% solution of which in 80% toluene and 20% ethyl alcohol has a viscosity of 10 centipoises | 27.0 |
| Phenol-formaldehyde condensation product condensed to its intermediate soluble stage | 13.5 |
| Boric acid | 6.0 |
| Sodium fluoride | 18.3 |
| Zirconium silicate, —325 mesh particle size | 2,635.2 |

*Example A-4*

|   | Grams |
|---|---|
| Liquefied monochlorodifluoromethane (Freon 22) | 1,800.0 |
| Polymerized vinyl acetate having a viscosity of 900 centipoises at 20° C. with molar solution in benzene | 20.25 |
| Ethyl cellulose, ethylated to from 46.5% to 48.5% and a 5% solution of which in 80% toluene and 20% ethyl alcohol has a viscosity of 20 centipoises | 6.75 |
| Phenol-formaldehyde condensation product condensed to its intermediate soluble stage | 13.5 |
| Primary ammonium phosphate —325 mesh particle size | 81.0 |
| Zirconium silicate, —325 mesh particle size | 2,578.5 |

*Example B-1*

|   | Grams |
|---|---|
| Liquefied monochlorodifluoromethane (Freon 22) | 18,000 |
| Polymerized vinyl acetate having a viscosity of 900 centipoises at 20° C. with molar solution in benzene | 400 |
| Ethyl cellulose, ethylated from 46.5% to 48.5% and a 5% solution of which in 80% toluene and 20% ethyl alcohol has a viscosity of 20 centipoises | 132 |
| Primary ammonium phosphate, —325 mesh particle size | 500 |
| Phenol-formaldehyde condensation product condensed to its intermediate soluble stage | 148 |
| Aluminum silicate (mullite) of —14 mesh, +25 mesh particle size | 14,568 |
| Zirconium silicate —325 mesh particle size | 23,952 |

*Example B-2*

|   | Grams |
|---|---|
| Liquefied monochlorodifluoromethane (Freon 22) | 18,000 |
| Polymerized vinyl acetate having a viscosity of 700 to 900 centipoises at 20° C. with molar solution in benzene | 400 |
| Ethyl cellulose ethylated to an extent of 46.5% to 48.5% and having a viscosity of 20 centipoises when a 5% solution thereof is dissolved in a mixture of 80% toluene and 20% ethanol | 132 |
| Phenol-formaldehyde condensation product condensed to its intermediate soluble stage | 148 |
| Sodium fluoride | 54 |
| Boric acid | 18 |
| Aluminum silicate (mullite), —14 mesh, +25 mesh particle size | 14,568 |
| Zirconium silicate, —325 mesh particle size | 23,952 |

*Example B-3*

|   | Grams |
|---|---|
| Liquefied monochlorodifluoromethane (Freon 22) | 18,800.0 |
| Polymerized vinyl acetate having a viscosity of 700 to 900 centipoises at 20° C. with molar solution in benzene | 400.0 |
| Ethyl cellulose ethylated to an extent of 46.5% to 48.5% and having a viscosity of 20 centipoises when a 5% solution thereof is dissolved in a mixture of 80% toluene and 20% ethanol | 132.0 |
| Phenol-formaldehyde condensation product condensed to its soluble intermediate stage | 148.0 |
| Primary ammonium phosphate, —325 mesh particle size | 800.0 |
| Zirconium silicate, —325 mesh particle size | 23,952.0 |
| Mullite (aluminum silicate) —14 mesh, +35 mesh particle size | 14,568.0 |

In general, the shell-forming coating compositions given above in Examples A-1 to A-4, are suitable for producing the outer backing shell layer by substituting for the fine refractory particle ingredients thereof, a mixture of coarse refractory particles with fine refractory particles proportioned in the manner given above for the refractory particle ingredients of the Examples B-1 to B-3. Furthermore, the amount of the liquid carrier, such as liquefied monochlorodifluoromethane, present in the examples of the coating compositions given above may be increased (or decreased) for decreasing (or increasing) the viscosity of the coating composition in accordance with the particular requirements and the particular shape of the frozen mercury pattern of the cast article that is to be produced with a thin-walled shell mold of the invention.

Any of the shell forming coating compositions given in Examples A-1 through A-4 may be utilized for forming the inner shell layer of a thin-wall shell mold of the invention and any of the compositions given in Examples B-1 through B-7 may be utilized in preparing the outer backing shell layer of such shell mold. However, in producing such two-layer thin shell molds of the invention it is of particular advantage to form the outer backing shell layer with a raised temperature binder which is an ammonium phosphate and to form the inner shell layer with a raised temperature binder which is an alkali metal fluoride, an alkali metal borate, an alkali metal tetraborate, or a mixture of an alkali metal fluoride and an alkali metal borate or tetraborate, or compounds which react to form such binder compounds or mixtures.

Such combination of different high temperature binder ingredients in the inner shell layer and the outer backing shell layer of such shell mold is of advantage because a reaction occurs between the alkali metal compound or compounds on the exterior surface of the inner shell layer with the ammonium phosphate at the surface interior of the outer backing shell layer which reaction results in the formation of a metal phosphate at the junction region between the inner and outer shell layers. The metal phosphate junction region so formed between the inner shell layer and the outer backing shell layer constitutes only a relatively weak bond between them, which is capable of yielding and permits the inner shell layer to slightly contract or expand; for instance, when metal having a very high melting point is cast into the mold cavity or when hot molten metal cast into the mold cavity cools and contracts about cores, or like wall portions of the mold.

In producing shell molds of the invention, it is also of advantage to use shell-forming coating compositions of the type given in the foregoing examples which contain the combination of polymerized vinyl acetate and ethyl cellulose as the organic resinous material, either with or without a thermosetting resin ingredient, such as phenol-formaldehyde condensation product. When a phenol-formaldehyde condensation product is utilized in the shell-forming coating composition, it does not become effective as a binder for the refractory particles until it is converted by the applied heat into its infusible insoluble state, thus supplementing the organic resinous binder ingredients in binding the refractory particles together at temperatures in the range from about 150° C. to about 530° C., and becoming modified with them into vapors at temperatures, thereby giving the thin shell mold its desired great porosity.

In preparing the inner shell layer of a shell mold consisting of one or more shell layers, it is also desirable to utilize as the raised temperature binder in the inner shell layer a compound or a mixture of compounds having a metal base, such as a metal fluoride, a metal borate, or a metal tetraborate, or a mixture of a metal fluoride and a metal borate or a metal tetraborate because when such compounds or mixtures are utilized as the raised temperature binder, the hardness of the inner surface of the mold cavity may be controlled by varying the percentage of the raised tempertaure binder that is utilized. Compounds containing an alkali metal as the base are particularly suitable, such as sodium fluoride, sodium borate, or sodium tetraborate, or a mixture of sodium fluoride and sodium borate or sodium tetraborate, or compounds which react to provide sodium borate or sodium tetraborate or a mixture of sodium fluoride and sodium borate or sodium tetraborate.

It should be noted that boron and fluorine compounds having a metal base, such as an alkali metal base, do not become effective as a binder for the refractory particles until the shell mold has been heated to a temperature of from approximately 450° to 600° C. Consequently, when such binders are utilized in both the inner and outer shell layers, a considerable portion of the organic resinous binder will have become modified into a vapor before the raised temperature binder becomes effective as a binder for the refractory particles and as a result the shell mold may bend or sag slightly during the baking operation. However, when an ammonium phosphate of comparatively small particle size is utilized as the raised temperature binder ingredient for the outer shell layer, however, the ammonium phosphate decomposes to form phosphoric acid at a comparatively low temperature, such as at temperatures of approximately 300° to 400° C. and consequently the shell mold will retain its strength throughout the entire baking range.

When casting molten ferrous metals, or other metals which tend to react with or absorb phosphorus from the mold material, it is of advantage to form the inner shell layer with a raised temperature binder formed of a metal fluoride, a metal borate or a metal tetraborate, or a mixture thereof, such as an alkali metal fluoride, an alkali metal borate or an alkali metal tetraborate, and particularly sodium fluoride, sodium borate, sodium tetraborate, or mixtures thereof, or compounds which react to form sodium borate or sodium tetraborate, or a mixture of sodium fluoride and sodium borate or sodium tetraborate. Thus if the inner shell layer contains an ammonium phosphate as the raised temperature binder, the ferrous metal has the tendency to absorb phosphorus from the mold. On the other hand, if the inner shell layer contains a metal borate or a metal tetraborate or a metal fluoride, or a mixture of a metal fluoride and a metal borate or a metal tetraborate, and particularly a compound or mixture of the type mentioned having a sodium base, the inner shell layer prevents the molten ferrous or like metal being cast from absorbing phosphorus from the outer shell layer while the ammonium phosphate in the outer backing shell layer makes it possible to prevent sagging of the shell mold when, in processing, it is heated to a raised temperature at which the raised temperature binder in the shell mold becomes effective as a binder for the refractory particles and the organic resinous binder becomes modified to render the shell mold porous.

In preparing substantially thin castings in which the thickness of the shell mold is approximately $\frac{1}{32}$ of an inch, an inner shell layer having a thickness of $\frac{1}{64}$ of an inch will prevent the ferrous metal from absorbing any substantial amount of phosphorus from the outer shell layer. When thick castings are to be formed, the thickness of the inner shell layer may range from $\frac{1}{32}$ to $\frac{1}{8}$ of an inch in cases where the overall thickness of the shell mold varies up to $\frac{1}{4}$ of an inch in thickness.

In forming shell molds in which the raised temperature binder is an alkali metal fluoride, an alkali metal borate or tetraborate, or a mixture of an alkali metal fluoride and an alkali metal borate or tetraborate, or compounds which react to form an alkali metal borate or tetraborate, or a mixture of an alkali metal fluoride and an alkali metal borate or tetraborate, the amount of the raised temperature binder may vary from approximately .2% to 2% based on the total amount of dried shell layer body which has been formed after the carrier volatilizes, and the amount of ammonium phosphate in the outer backing layer may vary from approximately 2% to 5% of the dried body thereof. A satisfactory shell mold is obtained when the composition disclosed in Example A–1 is utilized in preparing the inner shell layer and the composition disclosed in Example B–1 is utilized in providing the outer shell layer. In forming a shell two-layer mold of the invention wherein the composition of the inner layer is different from the composition in the outer layer, it is not essential, though desirable, that the refractory particles in the outer shell layer shall be composed partly of coarse refractory particles.

In preparing a slurry of the shell forming compositions for producing shell molds of the invention, the solid ingredients of the composition are precooled to a temperature below the freezing temperature of the frozen mercury pattern and then thoroughly mixed with the liquefied monochlorodifluoromethane, which is also maintained at such low temperature.

To facilitate the mixture of the raised temperature binder with the refractory particles, a premixture of the raised temperature binder with a portion of the refractory material is prepared prior to mixing the solid ingredients with the liquefied carrier or solvent, such as monochlorodifluoromethane. For example, the ammonium phosphates of Examples A–2 and B–1 may be mixed with equal proportions of the zirconium silicate and the premixture thus formed suspended in a liquid in which the ammonium phosphate is insoluble, such as carbon tetrachloride. The suspension, thus formed, is then ground in a suitable mill, such as a ball or pebble mill for approximately nine to ten hours. After evaporation of the carbon tetrachloride, the premixture together with the remainder of the solid ingredients is precooled to a temperature below the freezing temperature of the frozen mercury pattern and then thoroughly mixed with the monochlorodifluoromethane which is likewise maintained at such low temperatures.

Shell molds of the invention which contain the raised temperature binder have proven very effective for casting metals of high melting temperatures, such as cobalt-chromium-nickel alloys (Vitalium) or stainless steel alloys, into articles such as gas turbine buckets, gas turbine vanes or other articles.

In order to render the raised temperature binder effective the shell mold has to be subjected to a baking or firing treatment at elevated temperatures, at which the raised temperature binder becomes effective in binding the refractory particles into a self-supporting shell, and at which the low temperature resinous binder is fully, or at least partially modified into a vapor and driven off to render the mold porous.

Baking temperatures in the range of about 530° C. to 1200° C. give good results. At such baking temperatures, the low temperature organic resinous binder that is adherent to a frozen mercury pattern is modified to provide a vapor which exudes or is driven off through the mold walls thereby rendering the shell mold porous while the raised temperature binder becomes effective in binding the refractory particles together. For instance, when sodium fluoride and boric acid are utilized as the raised temperature binder of the inner shell layer and primary ammonium phosphate is utilized as the raised temperature binder of the outer backing shell layer, the sodium fluoride reacts with the boric acid at raised temperatures to form sodium tetraborate which envelops the refractory particles and any excess sodium fluoride that is present reacts with the refractory particles in the inner layer to prove an additional binding action, and the ammonium phosphate in the outer shell layer is decomposed at raised temperatures to form phosphoric acid which reacts with the refractory particles in the outer layer. The ammonium phosphate at the interior surface of the outer shell layer also reacts with the sodium fluoride at the exterior surface of the inner shell layer to form sodium phosphate. The sodium phosphate so formed at the junction region between the inner and outer shell layers is a relatively weak binder and thus provides a weak junction region which permits the inner shell layer to yield when hot metal is cast into the cavity mold or when the cooling metal cast into the mold cavity contracts about cores or other inserts of the shell mold. In a similar way, when a shell mold is impregnated with a binder that becomes effective at raised temperatures, the heating or firing of the mold also decomposes or vaporizes the organic resinous binder and causes the raised temperature binder to become effective as a binder for the refractory particles.

After the shell molds of the invention from which the mercury has been removed, are fired with the raised temperature binder present, the metal may be cast therein by any desirable method, such as by static or centrifugal casting, or the molten metal may be cast in the shell mold under pressure or under vacuum. Thus, a shell mold such as shown at 21 in Fig. 4, may be suspended in a suitable vessel, such as in flask 24, of Fig. 5, and supported therein by any suitable loose-particle refractory material such as loose sand which is placed or blown around the shell mold. When the shell mold is intricate and it is difficult for the loose refractory material to flow into the fine crevices, the flask 24 is vibrated to assist in packing the loose refractory particles. The hot molten metal is cast into the cavity of the thin-walled shell mold 21 so held suspended within flask 24. Since the shell mold of the invention is thin and porous, it permits gases to pass through walls of the shell mold during casting of the molten metal.

In retrieving castings from the shell molds shown, a large portion of the shell mold may be easily removed from the casting. If the cast metal may be quenched in liquids, such as oil or water, without adversely affecting its physical or metallurgical properties, or if quenching is desirable to improve its metallurgical properties, the casting may be quenched and a considerable portion of the refractory material will fall off during the quenching operation. The remainder of the shell mold may be removed by blasting, such as sand blasting.

It will be apparent to all those skilled in the art that the novel principles of the invention disclosed herein in connection with specific exemplifications thereof will suggest various other modifications and applications of the same. It is accordingly desired that in the present invention they shall not be limited to the specific exemplification thereof described herein.

We claim:

1. An investment composition in the form of a slurry for application as a layer or film to a frozen mercury pattern below the freezing temperature of the pattern material and producing a shell-like mold around said pattern, said composition comprising as normally solid composition ingredients which form the applied film a refractory material of small particle size constituting a predominant amount of said solid ingredients, an inorganic raised temperature binder for the refractory particles constituting from 0.25% to 5% of said solid ingredients and selected from the group of substances consisting of ammonium phosphates, alkali metal phosphates, alkali metal fluorides, mixtures of alkali metal fluorides and boric acid, mixtures of alkali metal fluorides and boric oxide, alkali metal borates, beryllium borates, alkali metal silicates, and mixtures of at least two of said substances, said inorganic binder being present in amount sufficient to bind the refractory particles of a shell-like mold into a self-supporting structure after having been rendered effective as a binder at a raised temperature between 150° C. and 1250° C. to which a mold is subjected, an organic thermoplastic resinous binder for the refractory particles and the raised temperature binder constituting 0.5% to 5% of said solid ingredients and which has the property of causing a film of said composition to adhere to said pattern and of binding the refractory particles and the raised temperature binder together into a mold over a temperature range from below said freezing temperature up to at least said raised temperature, and a liquid carrier which is an organic solvent and at least partially dissolves said organic binder below said freezing temperature and has a boiling point within +40° C. from said freezing temperature at atmospheric pressure and volatilizes in a short period of time below said freezing temperature, said carrier being present in an amount sufficient to hold at least uniformly dispersed therein all solid ingredients of said composition and to provide with said solid ingredients a slurry of sufficiently low viscosity at temperatures below said freezing temperature to enable said composition to be applied to said pattern in the form of a film at temperatures below said freezing temperature.

2. An investment composition in the form of a slurry for application as a layer or film to a frozen mercury pattern below the freezing temperature of the pattern material and producing a shell-like mold around said pattern, said composition comprising as normally solid composition ingredients which form the applied film a refractory material of small particle size constituting a predominant amount of said solid ingredients, an inorganic raised temperature binder for the refractory particles constituting from 0.25% to 5% of said solid ingredients and consisting of an ammonium phosphate having a (PO4) group and at least one (NH4) group, said ammonium phosphate being in the form of small particles and decomposing at a raised temperature between 150° C. and 430° C. to form phosphoric acid, and being present in sufficient amount to bind the refractory particles into a strong shell layer at said raised temperature, an organic thermoplastic resinous binder for the refractory particles and the raised temperature binder constituting 0.5% to 5% of said solid ingredients and which has the property of causing a film of said composition to adhere to said pattern and of binding the refractory particles and the raised temperature binder together into a mold over a temperature range from below said freezing temperature up to at least said raised temperature, and a liquid carrier which is an organic solvent and at least partially dissolves said organic binder below said freezing temperature and has a boiling point within +40° C. from said freezing temperature at atmospheric pressure and volatilizes in a short period of time below said freezing temperature, said carrier being present in an amount sufficient to hold at least uniformly dispersed therein all solid ingredients of said composition and to provide with said solid ingredients a slurry of sufficiently low viscosity at temperatures below said freezing temperature to enable said composition to be applied to said pattern in the form of a film at temperatures below said freezing temperature.

3. An investment composition as claimed in claim 2, the organic binder being selected from the group consisting of polymerized vinyl acetate, ethyl cellulose that has been ethylated at least 46.5%, and a mixture of polymerized vinyl acetate with such ethyl cellulose.

4. An investment composition as claimed in claim 2, said solvent comprising at least one substance selected from the group consisting of monochlorodifluoromethane, methyl chloride, and mixtures of said substances.

5. An investment composition as claimed in claim 2, the organic binder being selected from the group consisting of polymerized vinyl acetate, ethyl cellulose that has been ethylated at least 46.5%, and a mixture of polymerized vinyl acetate with such ethyl cellulose, said solvent comprising monochlorodifluoromethane.

6. An investment composition as claimed in claim 2, the organic binder being selected from the group consisting of polymerized vinyl acetate, ethyl cellulose that has been ethylated at least 46.5%, and a mixture of polymerized vinyl acetate with such ethyl cellulose, said solvent comprising methyl chloride.

7. An investment composition as claimed in claim 2, said organic binder comprising a mixture of polymerized vinyl acetate and ethyl cellulose that has been ethylated at least 46.5%.

8. An investment composition as claimed in claim 2, said organic binder comprising a mixture of polymerized vinyl acetate and ethyl cellulose that has been ethylated at least 46.5%, said solvent comprising at least one substance selected from the group consisting of monochlorodifluoromethane, methyl chloride, and mixtures of said substances.

9. An investment composition as claimed in claim 2, said organic binder comprising a mixture of polymerized vinyl acetate and ethyl cellulose that has been ethylated at least 46.5%, said solvent comprising monochlorodifluoromethane.

10. An investment composition as claimed in claim 2, said organic binder comprising a mixture of polymerized vinyl acetate and ethyl cellulose that has been ethylated at least 46.5%, said solvent comprising methyl chloride.

11. An investment composition as claimed in claim 1, said organic binder comprising polymerized vinyl acetate in an amount from .25% to 7% of said solid ingredients.

12. An investment composition as claimed in claim 1, said organic binder comprising polymerized vinyl acetate in an amount from .25% to 5% of said solid ingredients, said carrier being selected from the group consisting of monochlorodifluoromethane, methyl chloride and a mixture of monochlorodifluoromethane and methyl chloride.

13. An investment composition as claimed in claim 1, said organic binder comprising polymerized vinyl acetate in an amount from .25% to 5% of said solid ingredients, said carrier comprising monochlorodifluoromethane.

14. An investment composition as claimed in claim 1, said organic binder comprising polymerized vinyl acetate in an amount from .25% to 5% of said solid ingredients, said carrier comprising methyl chloride.

15. An investment composition as claimed in claim 1, said organic binder comprising polymerized vinyl acetate in an amount from .25% to 5% of said solid ingredients, said inorganic binder comprising an alkali metal fluoride and boric acid.

16. An investment composition as claimed in claim 1, said organic binder comprising polymerized vinyl acetate in an amount from .25% to 5% of said solid ingredients, said inorganic binder comprising an alkali metal fluoride and boric acid, said carrier being selected from the group consisting of monochlorodifluoromethane, methyl chloride and a mixture of monochlorodifluoromethane and methyl chloride.

17. An investment composition as claimed in claim 1, said organic binder comprising polymerized vinyl acetate in an amount from .25% to 5% of said solid ingredients, said inorganic binder comprising an alkali metal fluoride and boric oxide.

18. An investment composition as claimed in claim 1, said organic binder comprising polymerized vinyl acetate in an amount from .25% to 5% of said solid ingredients, said inorganic binder comprising an alkali metal fluoride and boric oxide, said carrier being selected from the group consisting of monochlorodifluoromethane, methyl chloride and a mixture of monochlorodifluoromethane and methyl chloride.

19. An investment composition as claimed in claim 1, said organic binder comprising polymerized vinyl acetate in an amount from .25% to 5% of said solid ingredients, said inorganic binder comprising an ammonium phosphate of fine particle size.

20. An investment composition as claimed in claim 1, said organic binder comprising polymerized vinyl acetate in an amount from .25% to 5% of said solid ingredients, said inorganic binder comprising an ammonium phosphate of fine particle size, said carrier being selected from the group consisting of monochlorodifluoromethane, methyl chloride and a mixture of monochlorodifluoromethane and methyl chloride.

21. An investment composition as claimed in claim 1, said organic binder comprising ethyl cellulose which has been ethylated to at least 20% and constituting .25% to 5% of said solid ingredients.

22. An investment composition as claimed in claim 1, said organic binder comprising ethyl cellulose which has been ethylated to at least 20% and constituting .25% to 5% of said solid ingredients, said carrier being selected from the group consisting of monochlorodifluoromethane, methyl chloride and a mixture of monochlorodifluoromethane and methyl chloride.

23. An investment composition as claimed in claim 1, said organic binder comprising ethyl cellulose which has been ethylated to at least 20% and constituting .25% to 5% of said solid ingredients, said solvent comprising monochlorodifluoromethane.

24. An investment composition as claimed in claim 1, said organic binder comprising ethyl cellulose which has been ethylated to at least 20% and constituting .25% to 5% of said solid ingredients, said solvent comprising methyl chloride.

25. An investment composition as claimed in claim 1, said organic binder comprising ethyl cellulose which has been ethylated to at least 20% and constituting .25% to 5% of said solid ingredients, said inorganic binder comprising an alkali metal fluoride and boric acid.

26. An investment composition as claimed in claim 1, said organic binder comprising ethyl cellulose which has been ethylated to at least 20% and constituting .25% to 5% of said solid ingredients, said inorganic binder comprising an alkali metal fluoride and boric acid, said carrier being selected from the group consisting of monochlorodifluoromethane, methyl chloride and a mixture of monochlorodifluoromethane and methyl chloride.

27. An investment composition as claimed in claim 1, said organic binder comprising ethyl cellulose which has been ethylated to at least 20% and constituting .25% to 5% of said solid ingredients, said inorganic binder comprising an alkali metal fluoride and boric oxide.

28. An investment composition as claimed in claim 1, said organic binder comprising ethyl cellulose which has been ethylated to at least 20% and constituting .25% to 5% of said solid ingredients, said inorganic binder comprising an alkali metal fluoride and boric oxide, said carrier being selected from the group consisting of monochlorodifluoromethane, methyl chloride and a mixture of monochlorodifluoromethane and methyl chloride.

29. An investment composition as claimed in claim 1, said organic binder comprising ethyl cellulose which has been ethylated to at least 20% and constituting .25% to 5% of said solid ingredients, said inorganic binder comprising an ammonium phosphate of fine particle size.

30. An investment composition as claimed in claim 1, said organic binder comprising ethyl cellulose which has been ethylated to at least 20% and constituting .25% to 5% of said solid ingredients, said inorganic binder comprising an ammonium phosphate of fine particle size, said carrier being selected from the group consisting of monochlorodifluoromethane, methyl chloride, and a mixture of monochlorodifluoromethane and methyl chloride.

References Cited in the file of this patent

UNITED STATES PATENTS

| | | |
|---|---|---|
| 2,409,910 | Stober | Oct. 22, 1946 |
| 2,521,614 | Valyi | Sept. 5, 1950 |

FOREIGN PATENTS

| | | |
|---|---|---|
| 585,665 | Great Britain | Feb. 18, 1947 |